United States Patent Office 3,734,925
Patented May 22, 1973

3,734,925
N-AMINO-3,4-DIMETHYL-6-ISOBUTYL-
PHTHALIMIDES
Pasquale P. Minieri, Woodside, N.Y., assignor to Tenneco
Chemicals, Inc.
No Drawing. Filed Feb. 8, 1971, Ser. No. 113,710
Int. Cl. C07d 27/52
U.S. Cl. 260—326 N     5 Claims

ABSTRACT OF THE DISCLOSURE

Fungicidal compositions that are suitable for use on living plant materials intended for human or animal consumption contain as their fungicidally-active component a compound having the structural formula

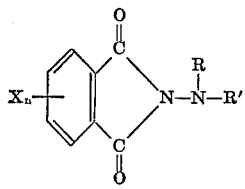

wherein X represents a lower alkyl group, chlorine, phenyl, or nitro; $n$ represents an integer in the range of 1 to 4, R represents hydrogen or a lower alkyl group; R' represents hydrogen, a lower alkyl group, or the group —COOR''; and R'' represents a lower alkyl group.

---

This invention relates to fungicidal compounds and to a method of controlling the growth of fungi. More particularly, it relates to fungicidal compositions that are suitable for use on living plant materials that are intended for human or animal consumption and to a method of controlling the growth of fungi on the plant materials through the use of these compositions.

In accordance with this invention, it has been found that certain substituted hydrazine compounds are highly effective against a wide variety of plant pathogens, including those responsible for late blight of tomatoes, cucumber anthracnose, and other serious crop diseases. Because they provide long lasting protection, fewer applications of these fungicides are required to control plant diseases than are necessary when the previously known agricultural fungicides are used.

The substituted hydrazine compounds that are used as the primary fungicidally-active components of the compositions of this invention may be represented by the structural formula

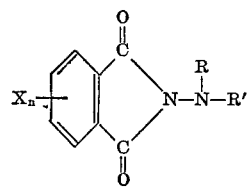

wherein X represents an alkyl group having from 1 to 4 carbon atoms, chlorine, phenyl, or nitro; $n$ represents an integer in the range of 1 to 4; R represents hydrogen or an alkyl group having from 1 to 4 carbon atoms; R' represents hydrogen, an alkyl group having from 1 to 4 carbon atoms, or the group —COOR''; and R'' represents an alkyl group having 1 to 4 carbon atoms. Illustrative of these compounds are 4-nitrophthalic hydrazide, 3,4-dipropylphthalic hydrazide, N-(dimethylamino)-2,6-dichlorophthalimide, N-(isopropylamino) - 3,4,5,6-tetraphenylphthalimide, N-(carbpropoxyamino) - 2 - chlorophthalimide, and the like. A group of the substituted phthalic hydrazides that have been found to be particularly effective as fungicides for use on living plants may be represented by the structural formula

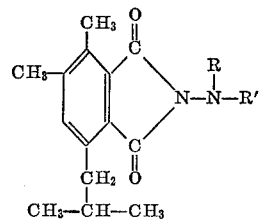

wherein R, R', and R'' have the aforementioned significance. Among the most effective of these compounds as fungicides are the following: N-(carbmethoxyamino)-3,4 - dimethyl - 6 - isobutylphthalimide, N-(carbbutoxyamino)-3,4-dimethyl-6-isobutylphthalimide, 3,4-dimethyl-6 - isobutylphthalic hydrazide, N-(dimethylamino)-3,4-dimethyl - 6-isobutylphthalimide, and N-(dibutylamino)-3,4 - dimethyl-6-isobutylphthalimide. One or more of the substituted hydrazides may be present in the fungicidal compositions of this invention.

The fungicidal compounds of this invention may be prepared by any suitable and convenient procedure. For example, they may be prepared by the reaction of a substituted phthalic anhydride with the appropriate hydrazine derivative, such as an alkyl carbazate, an alkyl hydrazine, or hydrazine hydrate. Suitable substituted phthalic anhydrides may be obtained, for example, by the aromatization of products of the condensation of maleic anhydride with dienes, such as 1,3 - hexadiene, 2,4-hexadiene, 3-methyl - 2,4 - hexadiene, 2,4-dimethyl-1,3-pentadiene, dimethylbutadienes, isoprene, 1,1,3-trimethylbutadiene, 1,1,4 - trimethylbutadiene, 1-phenyl-4-methylbutadiene, alloocimene, 5 - methyl-4-isopropyl-1,3-hexadiene, and the like, by treatment first with palladium and then with an alkaline or acidic aqueous solution.

While the fungicidal compounds of this invention may be applied as such to the soil, they are ordinarily and preferably combined with an inert fungicidal adjuvant carrier and applied as a solution, emulsion, suspension, or dust. Aqueous emulsions or suspensions that contain about 0.001 percent to 1 percent by weight, and preferably 0.01 percent to 0.5 percent by weight, of the active agent are particularly suitable for this use. These compositions may also contain about 0.01 percent to 0.1 percent by weight of a wetting agent, such as an alkyl sulfate, an alkyl aryl sulfonate, a sulfosuccinate, a polyethylene glycol ether, and the like. Alternatively, the fungicidal compounds may be dissolved in an organic solvent, such as acetone, naphtha, ethylene chloride, or kerosene, and applied as solutions, or they may be mixed with or deposited upon such finely-divided solid carriers as clay, chalk, bentonite, talc, kaolin, fullers' earth, and the like and applied as dusts.

The fungicidal compounds may be applied by known techniques to plants, to plant seeds, or to the soil in which plants are growing or are to be grown. For example, they may be applied to the parts of the plants above or in the soil, or the plant seeds may be contacted with the fungicidal compound. Alternatively, the fungicide may be introduced into the soil near the roots of the plants or applied to the surface of the soil and then mixed into the soil to the desired depth.

The amount of the fungicidal composition that is applied is dependent upon such factors as the species of plant being treated and the plant pathogen whose control is desired and is that amount which will inhibit or prevent the growth of the plant pathogen while causing little or no injury to the plants. About 1 pound to 200 pounds of the active compound is ordinarily applied per acre, with particularly good results being obtained when 5 pounds to 35 pounds per acre is used.

The substituted hydrazine compounds may be used as the sole active component of the fungicidal compositions.

If desired, however, these compositions may also contain other fungicides, such as sulfur and the metal dimethyldithiocarbamates; insecticides, such as DDT and benzene hexachloride; or plant nutrients, such as urea, ammonium nitrate, and potash.

The invention is further illustrated by the examples that follow:

EXAMPLE 1

(A) To 476 grams (3.5 moles) of freshly-distilled allo-ocimene was added a solution of 245 grams (2.5 moles) of maleic anhydride in 720 grams (8.17 moles) of ethyl acetate at such a rate that the temperature rose to 88°–90° C. and remained at that temperature throughout the addition. The reaction mixture was heated with stirring at 88°–90° C. for 5 hours and then heated under vacuum to remove the ethyl acetate. The residue was distilled under reduced pressure to remove unreacted allo-ocimene from the product. There was obtained about 450 grams of 3,4 - dimethyl - 6-isobutenyl-tetrahydrophthalic anhydride.

(B) A mixture of 330 grams (1.42 moles) of 3,4-dimethyl - 6 - isobutenyltetrahydrophthalic anhydride and 20 grams of 5% palladium on carbon was stirred for 6 hours at 260°–280° C. and then cooled to room temperature. After it had been allowed to stand overnight, the reaction mixture was treated with 820 ml. of a 15% aqueous sodium hydroxide solution, heated at 90°–100° C. for 1 hour, diluted with 1700 ml. of water, and filtered. The filtrate was acidified to pH 5 with hydrochloric acid. The crude product that precipitated was collected. A 90 percent yield of crude 3,4-dimethyl-6-isobutylphthalic anhydride was obtained. This product was used without purification in the preparation of the substituted hydrazine compounds.

(C) A mixture of 23.2 grams (0.1 mole) of 3,4-dimethyl - 6 - isobutylphthalic anhydride, 10.4 grams (0.1 mole) of ethyl carbazate, and 150 ml. of toluene was heated at its reflux temperature until 1.8 ml. of water had heated at its reflux temperature until 1.8 ml. of water had been evolved. After being heated at its reflux temperature for an additional 30 minutes, the reaction mixture was heated at 60° C. under reduced pressure to remove the toluene. There was obtained 30.8 grams of N - (carbethoxyamino) - 3,4 - dimethyl - 6 - isobutylphthalimide, which contained 64.0% C, 6.9% H, and 8.8% N (calculated, 64.2% C, 6.9% H, and 8.8% N). The structure of the compound was confirmed by infrared analysis.

EXAMPLE 2

A mixture of 46.5 grams (0.2 mole) of 3,4-dimethyl-6-isobutylphthalic anhydride (prepared by the process described in Example 1A and B), 35.3 grams (0.6 mole) of hydrazine hydrate (85 percent in water), and 195 ml. of water was heated at its reflux temperature for 3 hours. The reaction mixture was cooled to room temperature and filtered. The product obtained was washed with water, air dried, and then dried at 60° C. under reduced pressure. There was obtained 48.5 grams of 3,4-dimethyl-6-isobutylphthalic hydrazide that melted at 109°–111° C. and contained 68.26% C, 7.40% H, and 11.44% N (calculated 68.2% C, 7.3% H, and 11.4% N).

EXAMPLE 3

Using the procedure described in Example 1C, tert. butyl carbazate was reacted with 3,4-dimethyl - 6 - isobutylphthalic anhydride to form N-(carb-tert. butoxyamino)-3,4-dimethyl-6-isobutylphthalimide in a substantially quantitative yield. The product was a viscous oil that contained 66.7% C, 8.57% H, and 7.78% N (calculated 66.0% C, 7.58% H, and 8.1% N). Its structure was comfirmed by infrared analysis.

EXAMPLE 4

Using the procedure described in Example 1C, asym. dimethylhydrazine was reacted with 3,4-dimethyl - 6 - isobutylphthalic anhydride to form N-(dimethylamino)-3,4-dimethyl - 6 - isobutylphthalimide in a yield of 97.5 percent. The product was a waxy solid that contained 70.4% C and 8.7% H. (calculated 70.2% C and 8.1% H). Its structure was confirmed by infrared analysis.

EXAMPLE 5

Aqueous solutions were prepared by dissolving 100 mg. portions of the products of Examples 1–4 in 10 ml. of acetone that contained 2000 p.p.m. of sorbitan trioleate (Span 85) and 5000 p.p.m. of a polyoxyethylene ether of sorbitan monooleate (Tween 90). The acetone solutions were dispersed in 90 ml. portions of distilled water to form aqueous solutions that contained 1000 p.p.m. of the fungicidal compound. More dilute solutions were prepared by adding distilled water to these solutions.

EXAMPLE 6

A series of experiments was carried out in which tomato plants that had been sprayed with the aqueous solutions of Example 5 were sprayed with a suspension of spores of *Alternaria solani*, the fungus responsible for early blight of tomatoes. One week after treatment, the degree of suppression of the disease was noted. The results are given in Table I. In no case was there any visible injury to the tomato plant.

TABLE I

| Fungicide | Concentration of fungicide in aqueous solution (p.p.m.) | Percent control of early blight of tomatoes |
| --- | --- | --- |
| Product of— | | |
| Example 1 | 100 | 94 |
|  | 50 | 89 |
|  | 25 | 82 |
|  | 12 | 67 |
|  | 6 | 54 |
| Example 3 | 100 | 80 |
| Example 4 | 500 | 80 |
| Commercial fungicide—Maneb (manganous ethylene bisdithiocarbamate). | 100 | 98 |
|  | 50 | 95 |
|  | 25 | 75 |
|  | 12 | 68 |
|  | 6 | 50 |
| None | | 0 |

EXAMPLE 7

A series of experiments was carried out in which tomato plants that had been sprayed with the aqueous solutions of Example 5 were sprayed with a suspension of spores of *Phytophthora infestans*, the fungus that causes late blight of tomatoes. One week after treatment, the degree of suppression of the disease was noted. The results are given in Table II. In no case was there visible injury to the tomato plants.

TABLE II

| Fungicide | Concentration of fungicide in aqueous solution (p.p.m.) | Percent control of early blight of tomatoes |
| --- | --- | --- |
| Product of— | | |
| Example 1 | 100 | 98 |
|  | 20 | 97 |
|  | 4 | 53 |
| Example 2 | 250 | 80 |
| Example 3 | 100 | 95 |
|  | 30 | 80 |
| Commercial fungicide—Maneb | 100 | 100 |
|  | 20 | 97 |
|  | 4 | 31 |
| None | | 0 |

EXAMPLE 8

Tender green bean plants with fully expanded primary leaves were inoculated with spores of *Erypsiphe polygoni*, the powdery mildew fungus. Forty-eight hours later, the plants were sprayed with aqueous solutions prepared by the process of Example 5. After a period of 7-10 days, the degree of suppression of the disease was noted. The results obtained are summarized in Table III.

TABLE III

| Fungicide | Concentration of fungicide in aqueous solution (p.p.m.) | Control of powdery mildew of beans |
|---|---|---|
| Product of— | | |
| Example 1 | 1,000 | Good control. |
| Example 2 | 1,000 | Do. |
| Example 3 | 1,000 | Excellent control. |
|  | 100 | Do. |
|  | 20 | Good control. |
| Example 4 | 1,000 | Do. |

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

I claim:

1. A compound that has the structural formula

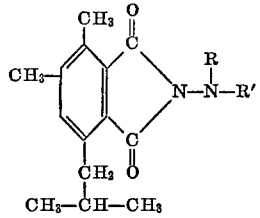

wherein R represents hydrogen or an alkyl group having from 1 to 4 carbon atoms; R' represents hydrogen, an alkyl group having from 1 to 4 carbon atoms, or the group —COOR''; and R'' represents an alkyl group having from 1 to 4 carbon atoms.

2. The compound as set forth in claim 1 that has the structural formula

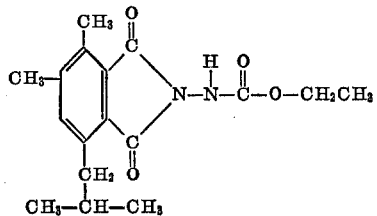

3. The compound as set forth in claim 1 that has the structural formula

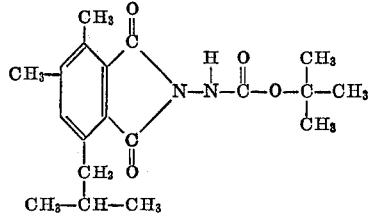

4. The compound as set forth in claim 1 that has the structural formula

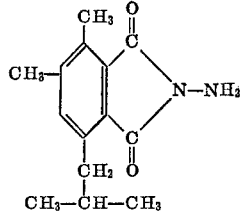

5. The compound as set forth in claim 1 that has the structural formula

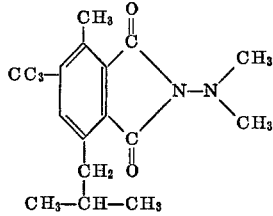

References Cited

UNITED STATES PATENTS 2,657,169  10/1953  Ligett et al. _____ 424—274

OTHER REFERENCES

Drew et al., J. Chem. Soc., 1937: 26–33.
Heidenbluth et al., J. Prakt. Chem. 30: 204–17 (1965).
Drew et al., J. Chem. Soc., 1937: 1841–6.

ALEX MAZEL, Primary Examiner

J. A. NARCAVAGE, Assistant Examiner

U.S. Cl. X.R.

424—274